US008023790B2

(12) United States Patent
Shimizu et al.

(10) Patent No.: US 8,023,790 B2
(45) Date of Patent: Sep. 20, 2011

(54) OPTICAL WAVEGUIDE FILM WITH MARK FOR POSITIONING AND METHOD FOR PRODUCING THE SAME

(75) Inventors: Keishi Shimizu, Kanagawa (JP);
Masahiro Igusa, Kanagawa (JP);
Toshihiko Suzuki, Kanagawa (JP);
Akira Fujii, Kanagawa (JP); Kazutoshi Yatsuda, Kanagawa (JP); Shigemi Ohtsu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 112 days.

(21) Appl. No.: 12/403,942

(22) Filed: Mar. 13, 2009

(65) Prior Publication Data

US 2010/0074585 A1   Mar. 25, 2010

(30) Foreign Application Priority Data

Sep. 19, 2008   (JP) ................................. 2008-240897

(51) Int. Cl.
*G02B 6/10* (2006.01)
*G02B 6/00* (2006.01)
(52) U.S. Cl. .......................... 385/131; 385/129; 385/147
(58) Field of Classification Search ........... 385/129–132
See application file for complete search history.

(56) References Cited

U.S. PATENT DOCUMENTS

| 5,361,382 | A | 11/1994 | Nakamura et al. |
| 6,227,722 | B1* | 5/2001 | Kropp ............................. 385/88 |
| 6,744,953 | B2* | 6/2004 | Lemoff et al. .................. 385/52 |
| 6,898,362 | B2* | 5/2005 | Forbes et al. .................. 385/132 |
| 6,929,760 | B2* | 8/2005 | Shimizu et al. ............... 264/1.24 |
| 7,539,384 | B2* | 5/2009 | Fujii et al. ..................... 385/129 |
| 2003/0147583 | A1* | 8/2003 | Saito .............................. 385/17 |
| 2004/0022499 | A1 | 2/2004 | Shimizu et al. |
| 2004/0076367 | A1* | 4/2004 | Eom et al. ....................... 385/18 |
| 2007/0058904 | A1* | 3/2007 | Ban et al. ........................ 385/52 |
| 2009/0304324 | A1* | 12/2009 | Kim et al. ....................... 385/14 |

FOREIGN PATENT DOCUMENTS

| JP | 5-323144 | A | 12/1993 |
| JP | 6-281826 | A | 10/1994 |
| JP | 2003-215368 | A | 7/2003 |
| JP | 2004-069742 | A | 3/2004 |

* cited by examiner

*Primary Examiner* — Rhonda Peace
(74) *Attorney, Agent, or Firm* — Sughrue Mion, PLLC

(57) ABSTRACT

An optical waveguide film includes: an optical waveguide film main body including an optical waveguide core through which light travels and a cladding portion that encloses the optical waveguide core and has a lower refractive index than that of the optical waveguide core; and a marking member that is disposed at least at a portion of a principal surface of the optical waveguide film main body so as to protrude from the principal surface and that includes, at a surface thereof, a groove-shaped mark for positioning.

9 Claims, 11 Drawing Sheets

OPTICAL WAVEGUIDE FILM WITH MARK FOR POSITIONING AND METHOD FOR PRODUCING THE SAME

CROSS-REFERENCE TO RELATED APPLICATION

This application claims priority under 35 USC 119 from Japanese Patent Application No. 2008-240897 filed Sep. 19, 2008.

BACKGROUND

1. Technical Field

The present invention relates to an optical waveguide film and a method for producing the same.

2. Related Art

An optical waveguide needs to be connected to a light-emitting/receiving device, optical fibers, or other optical waveguides. Therefore, it is preferable that the position of the core of the optical waveguide and the position of an end surface of the core be accurately recognized. However, waveguide cores and waveguide claddings are both transparent. Connection of an optical waveguide to light-emitting/receiving elements, optical fibers, or other optical waveguides can be made easier by separately providing an easily-detectable mark for positioning that has a fixed positional relationship relative to the end surface of the core. A mark for positioning enables accurate detection of the position of the optical waveguide core, and may take a form of plural minute (comparable to the size of the cross-section of the optical waveguide core) cross-shaped marks provided at the optical waveguide.

In order to accurately set the positional relationship between the mark for positioning and the end surface of the optical waveguide core that is to be connected to an external element, it is preferable to simultaneously form the mark for positioning and the core pattern using a core pattern forming process. This technique has been used in conventional methods for producing optical waveguides.

An optical waveguide production method exists that does not use a photomask or a template. In this method, an optical waveguide core is formed by cutting a flexible optical film with a dicing saw. This production method can be applied to formation of an optical waveguide having a large number of linear-array waveguide cores, such as an optical bus for high-speed data transmission between boards. Cutting using a dicing saw is effective in cost reduction since it enables realization of a fast processing.

SUMMARY

According to an aspect of the invention, there is provided an optical waveguide film including:

an optical waveguide film main body including an optical waveguide core through which light travels and a cladding portion that encloses the optical waveguide core and has a lower refractive index than that of the optical waveguide core; and a marking member that is disposed at least at a portion of a principal surface of the optical waveguide film main body so as to protrude from the principal surface and that includes, at a surface thereof, a groove-shaped mark for positioning.

BRIEF DESCRIPTION OF THE DRAWINGS

Exemplary embodiments of the present invention will be described in detail based on the following figures, wherein.

DETAILED DESCRIPTION

Figure 1:
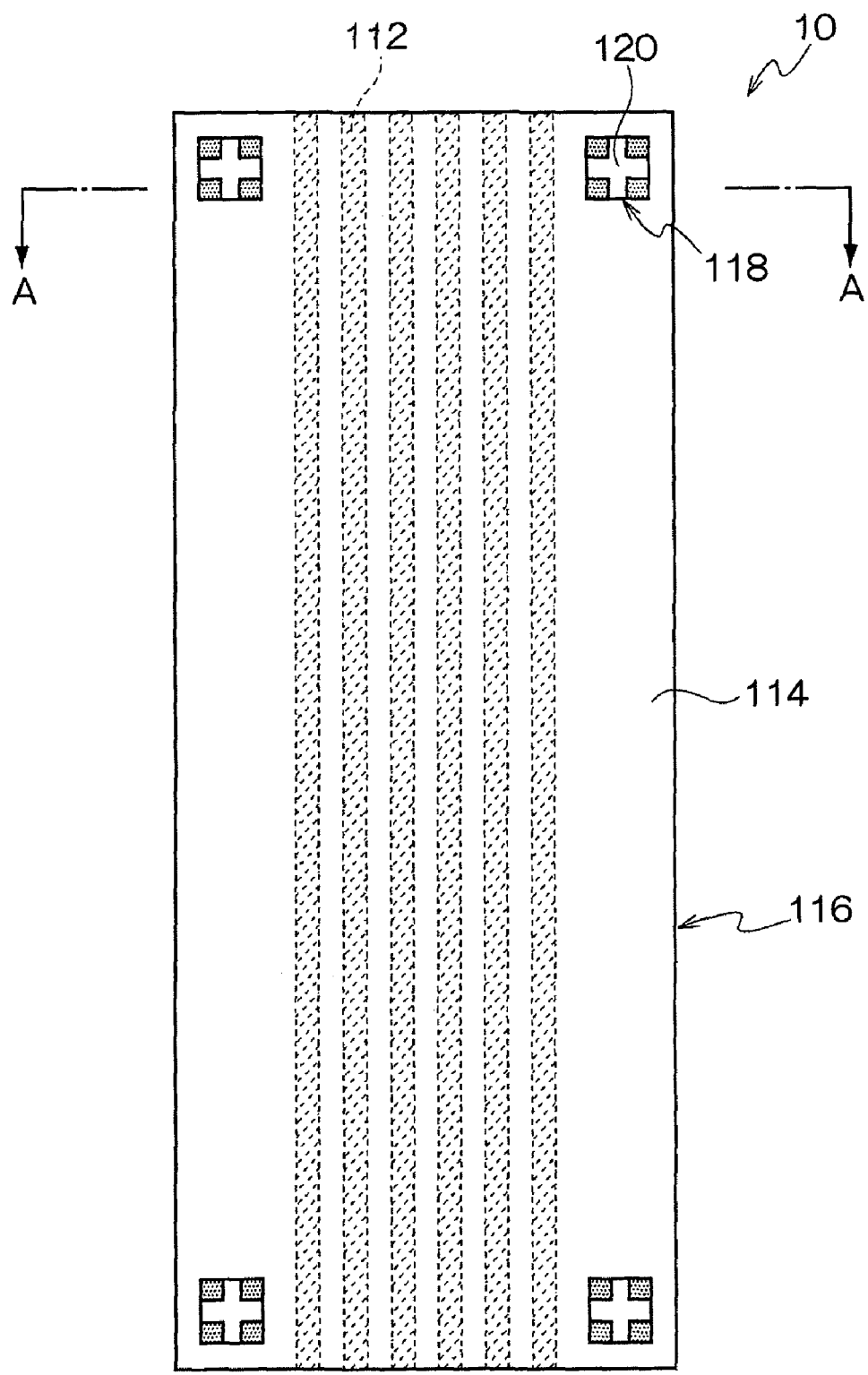
FIG. 1 is a schematic top view illustrating an optical waveguide film according to a first exemplary embodiment.

Exemplary embodiments of the present invention are described below with reference to the attached drawings. Elements having substantially the same function and action are designated by the same reference numeral throughout the drawings, and overlapping descriptions therefor are sometimes omitted.

First Exemplary Embodiment

Figure 2:
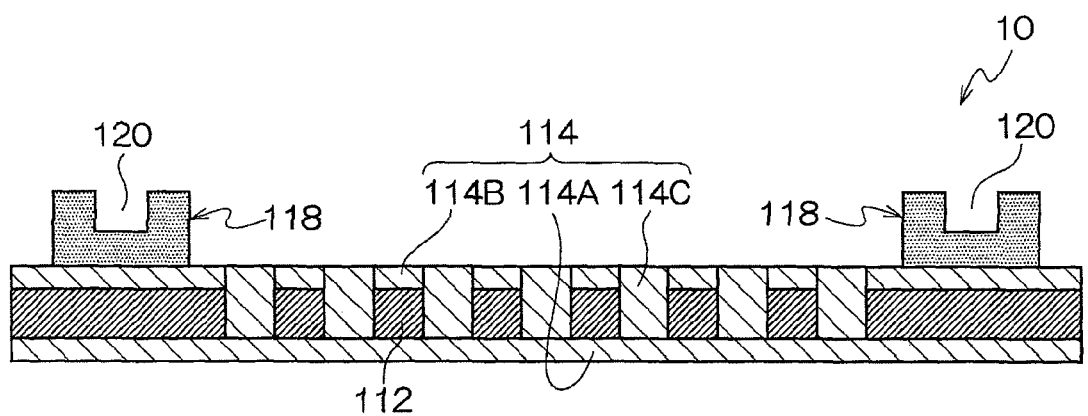
FIG. 2 is a cross-sectional view taken along line A-A shown in FIG. 1.
Figure 3B:
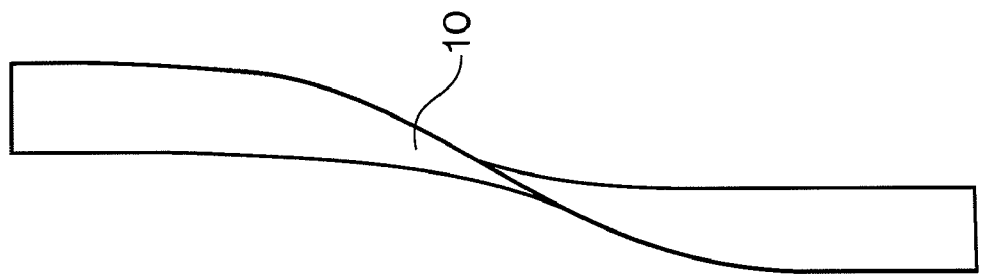
FIGS. 3A and 3B are perspective views showing that the optical waveguide film according to the first exemplary embodiment has flexibility (bending property)
Figure 3A:
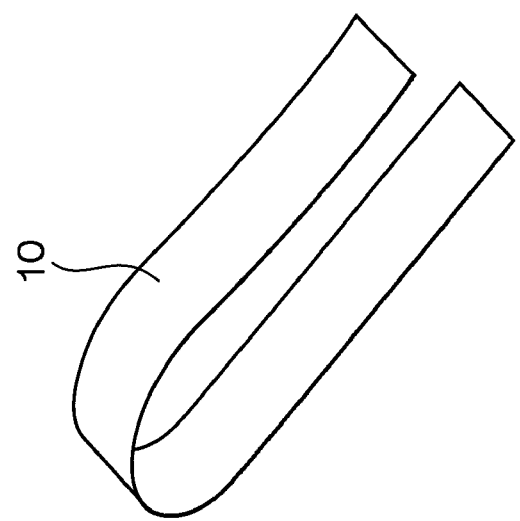

FIG. 1 is a schematic top view illustrating an optical waveguide film according to a first exemplary embodiment. FIG. 2 is a cross-sectional view taken along line A-A shown in FIG. 1. FIGS. 3A and 3B are perspective views showing that the optical waveguide film according to the first exemplary embodiment has flexibility (bending property).

Optical waveguide film 10 according to the first exemplary embodiment is, for example, a belt-shaped optical waveguide as shown in FIGS. 1 and 2. Optical waveguide 10 has optical waveguide film main body 116, which has cladding 114 and optical waveguide cores 112 embedded in cladding 114. One of the principal surfaces of optical waveguide film main body 116 is provided with, for example, marking members 118 having marks for positioning 120 on an upper surface thereof. The term, "principal surface" of an optical waveguide film, refers to a surface that is perpendicular to the thickness direction of the optical waveguide film.

The refractive index of optical waveguide cores 112 is higher than that of cladding 114. For example, when the difference in refractive index between optical waveguide cores 112 and cladding 114 (the difference between the refractive index of optical waveguide cores 112 and the refractive index of cladding 114) is, for example, 3%, an optical waveguide film is obtained which shows substantially no bend loss down to a curvature radius of 1.5 mm when bent. A larger difference in refractive index enables reduction of the bend radius at which optical loss due to bending does not occur. However, in consideration of mechanical bending property of the optical waveguide film and a loss caused at the connection to a light-emitting/receiving device, the difference in refractive index may be from about 2% to about 5%. When the difference in refractive index is from 4% to 5%, optical loss observed when bent to a practical degree is very small (even at a bend radius of 1 mm), and the connection to a light-emitting/receiving device is easy; therefore, the difference in this range is practically favorable.

Plural optical waveguide cores 112 are arranged in the same plane, and are arranged parallel to each other in the direction of the width of optical waveguide film 10 such that a beam of light travels through each waveguide core 112 and the respective beams travel parallel to each other. In the present exemplary embodiment, six optical waveguide cores 112 are disposed.

In each optical waveguide core 112, an inclined surface that is inclined with respect to the longitudinal direction when viewed from the side in the width direction of optical waveguide film 10 (or optical waveguide film main body 116) may be formed at least one end portion of the optical waveguide core 112 in the longitudinal direction. The inclined surface serves as a plane at which the optical path of light traveling through optical waveguide core 112 changes its direction. The inclined surface may be configured to form an angle of, for example 45° with respect to the longitudinal direction of optical waveguide core 112 when viewed from the side in the width direction of optical waveguide film 10 (or optical waveguide film main body 116). When light traveling through optical waveguide core 112 reaches the inclined surface, the light is reflected by a layer adjacent to the inclined surface (air layer in the present exemplary embodiment), so that the light traveling direction is changed.

Cladding 114 is formed of a material having a lower refractive index than that of optical waveguide cores 112, and disposed to enclose optical waveguide cores 112.

Each of the material for optical waveguide cores 112 and the material for cladding 114 is not particularly limited as long as the material is transparent at a wavelength used for optical waveguide film 10 and provides a desired difference in refraction index between optical waveguide core 112 and cladding 114. Examples thereof include an alicyclic olefin resin, an acrylic resin, an epoxy resin, and a polyimide resin.

When optical waveguide film 10 is covered with a flame-retardant resin as described below, it is preferable to use an acrylic resin or an epoxy resin as a material for cladding 114 at least in an area contacting the flame-retardant resin layer, from the viewpoint of obtaining excellent adhesiveness to the flame-retardant resin layer.

Marking members 118 each take a form of, for example, a cube. For example, four marking members 118 are disposed at the respective corners of one of the principal surfaces of optical waveguide film main body 116. Marking members 118 protrude from the one of the principal surfaces of optical waveguide film main body 116. The shape, number, position of marking members 118 is not particularly limited as long as (i) marking members 118 is disposed at least at a part of the principal surface so as to protrude from the principal surface of optical waveguide film main body 116 and (ii) mark for positioning 120 is visible when viewed from the principal surface side (i.e., when optical waveguide film 10 is observed from the upper side in FIG. 2).

The material of marking members 118 may be the same material as that of optical waveguide film main body 116. However, the material of marking members 118 is preferably a material that is harder than the material of optical waveguide film main body 116 (or than the material of the after-mentioned laminated material having cladding layers and a core layer, polymer film 10A), and examples of the harder material include silicon (Si), glass ($SiO_2$), and various resins such as a polycarbonate resin, an ABS resin (acrylonitrile-butadiene-styrene copolymer), or a glass fiber reinforced resin. Specifically, for example, marking member 118 preferably has a Young's modulus of from 5 GPa to 300 GPa or from about 5 GPa to about 300 GPa, and more preferably from 10 GPa to 200 GPa or about 10 GPa to about 200 GPa, in consideration of a balance between attachment accuracy and processability. In contrast, optical waveguide film main body 116 is required to have bending property. If the Young's modulus of optical waveguide film main body 116 is unnecessarily high, then bend stress when bent increases and possibility of breaking also increases. Therefore, the Young's modulus of optical waveguide film main body 116 is preferably 5 GPa or less or about 5 GPa or less, and more preferably 3 GPa or less or about 3 GPa or less. When the Young's modulus of marking members 118 is within the range described above, the distortion of marking members 118 themselves reduces, so that the accuracy at positioning by physical contact (attachment) improves compared to when the hardness of marking members 118 is outside the range described above.

Marking members 118 are adhered and/or fixed to a principal surface of optical waveguide film main body 116, for example by using an adhesive (such as a UV-curable or thermosetting, epoxy or acrylic adhesive).

Marks 120 for positioning (hereinafter, may also be referred to as "positioning marks 120") are portions that are alignment marks disposed as bases for alignment or the like. Positioning marks 120 are each formed by, for example, a cross-shaped groove formed on a surface (top surface) of corresponding marking member 118. The shape of each positioning mark 120 is not limited to a cross shape, and is not particularly limited as long as the shape can be visually recognized as a position detection mark (reference portion), such as a line shape. The groove width and/or groove depth of each positioning mark 120 may be freely set. However, when alignment (positioning of a reference portion) is performed by fitting an alignment member to a groove-shaped positioning mark 120 so as to attach the alignment member to the positioning mark 120, the groove width and/or groove depth may be set in consideration of the size of the alignment member.

Optical waveguide film 10 (optical waveguide film main body 116) is preferably formed of a flexible transparent resin film, and preferably shows high flexibility (high bending property) when deformed (for example when bent or twisted), as shown in FIGS. 3A and 3B. When optical waveguide film 10 is flexible, optical signals transmitted from an optical transmitter and receiver section travel through an optical waveguide formed in optical waveguide film 10 and are received by another optical transmitter and receiver section even when optical waveguide film 10 is deformed. Optical waveguide film 10 may have a degree of flexibility that allows a minimum bend radius of 3 mm or less. Assuming that a minute portion of a curve formed at the inner side of optical waveguide film 10 when optical waveguide film 10 is bent is approximated to a circle, the minimum bend radius is a value indicating the minimum radius of the circle. The permissible range thereof is measured by ASTM D-2176, which is incorporated herein by reference.

Optical waveguide film 10 (optical waveguide film main body 116) preferably has a thickness of from 50 μm to 500 μm or from about 50 μm to about 500 μm, and more preferably from 50 μm to 200 μm or from about 50 μm to about 200 μm.

The width of optical waveguide film 10 is preferably from 0.2 mm to 10 mm, and more preferably from 0.25 mm to 5 mm.

In the following, a method for producing optical waveguide film 10 according to the exemplary embodiment is described. FIGS. 4A to 4D and 5E to 5F are process charts showing a method for producing an optical waveguide film according to the first exemplary embodiment. FIGS. 4A to 4D and 5E to 5F are process charts at a cross section taken along A-A in FIG. 1. In the method according to the exemplary embodiment for producing optical waveguide film 10 described below, a process of producing plural optical waveguide films 10 through performing a cutting operation on a single polymer film 10A is described as an example.

Figure 4A:
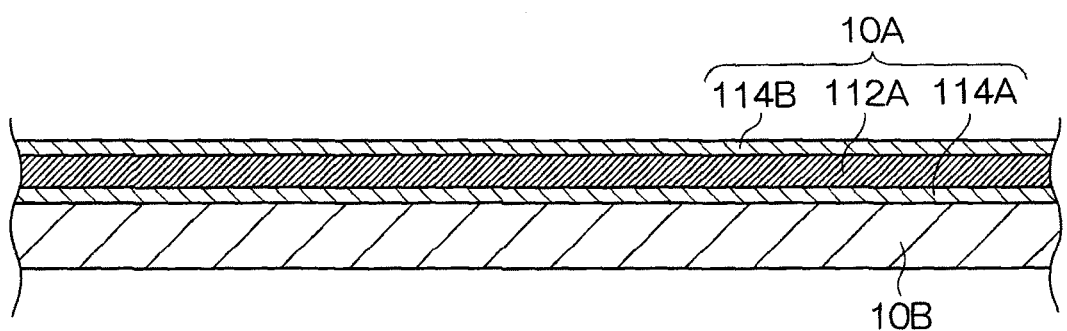
FIGS. 4A to 4D are process charts illustrating a first part of a method for producing an optical waveguide film according to the first exemplary embodiment.

In the method for producing optical waveguide film 10 according to the exemplary embodiment, polymer film 10A (laminated material) in which cladding layer 114A (a first cladding layer), core layer 112A, and cladding layer 114B (a second cladding layer) are disposed in this order is prepared as shown in FIG. 4A. In other words, polymer film 10A is prepared in which core layer 112A is sandwiched between two cladding layers (cladding layer 114A and cladding layer 114B). The method for providing the respective layers of polymer film 10A is not particularly limited as long as the disposed layers are tightly adhered to each other such that separation between the layers does not occur. A known method may be used, such as a laminating method or a spin coating method. Then, polymer film 10A prepared above is attached to dicing tape 10B.

The material for forming cladding layer 114A and cladding layer 114B is not particularly limited as long as there will be a certain difference in refractive index between core layer 112A (optical waveguide core 112) and the obtained cladding (cladding layer 114A and cladding layer 114B). The material for forming cladding layer 114A and cladding layer 114B may be selected according to the application, in consideration of, for example, the refractive index, optical characteristics such as optical transmittance, mechanical strength, heat resistance, and flexibility of the material. Examples of the material include radiation-curable resins, electron-beam-curable resins, and thermosetting resins. The material is preferably a UV-curable resin or a thermosetting resin, such as a UV-curable or thermosetting monomer, a UV-curable or thermosetting oligomer, or a mixture of the monomer and the oligomer, and more preferably a UV-curable resin.

Examples of the material for forming cladding layer 114A and cladding layer 114B include epoxy resins, acrylic resins (such as polymethyl methacrylate), alicyclic acrylic resins, styrene resins (such as polystyrene or an acrylonitrile-styrene copolymer), olefin resins (such as polyethylene, polypropylene, or an ethylene-propylene copolymer), alicyclic olefin resins, vinyl chloride resins, vinylidene chloride resins, vinyl alcohol resins, vinyl butyral resins, arylate resins, fluorine-containing resins, polyester resins (such as polyethylene terephthalate or polyethylene naphthalate), polycarbonate resins, cellulose diacetate, cellulose triacetate, amide resins (such as an aliphatic or aromatic polyamide), imide resins, sulfone resins, polyethersulfone resins, polyetheretherketone resins, polyphenylene sulfide resins, polyoxymethylene resins, and blends thereof.

Cladding layer 114A and cladding layer 114B each may be provided, for example, (a) by applying dropwise a liquid resin selected from the above materials onto a substrate such as a glass substrate, making the thickness of the liquid resin uniform by spin coating, and curing the resin, or (b) by using an already-formed resin film.

The thickness of each of cladding layer 114A and cladding layer 114B is not particularly limited, and is preferably from 10 µm to 100 µm, and more preferably from 20 µm to 50 µm, in consideration of factors such as optical properties, flexibility, after-mentioned cutting processability, and strength.

The thickness of cladding layer 114A does not have to be the same as that of cladding layer 114B. For example, the thickness of cladding layer 114B may be set to be smaller than the thickness of cladding layer 114A, so as to reduce the total thickness of polymer film 10A.

The material for forming core layer 112A may be, for example, a UV-curable resin, such as a UV-curable monomer, a UV-curable oligomer, or a mixture of the monomer and the oligomer. Examples of the material for forming core layer 112a include epoxy UV-curable resins and acrylic UV-curable resins.

For example, a curable resin for a core (a UV-curable resin) in a liquid state may be applied, in a uniform thickness, on cladding layer 114A, and the resin may be cured by irradiation with UV rays using, for example, a UV lamp, a UV-LED, or a UV irradiation apparatus, whereby core layer 112A may be formed.

The thickness of core layer 112A is not particularly limited, and may be set appropriately in accordance with the use. The thickness of core layer 112A is preferably from 20 µm to 120 µm, and more preferably from 30 µm to 90 µm, in consideration of factors such as optical properties, flexibility, after-mentioned cutting processability, and strength.

The size and total thickness of polymer film 10A are not particularly limited, and may be appropriately set in accordance with the material, use, and the like. For example, in order for optical waveguide film 10 to have flexibility, the thickness of polymer film 10A is preferably from 50 µm to 500 µm, and more preferably from 50 µm to 200 µm. The width of polymer film 10A is preferably from 0.2 mm to 10 mm, and more preferably from 0.25 mm to 5 mm. When the thickness and width of optical waveguide film 10 are set within the above range, flexibility and strength suitable for an optical waveguide can be easily secured.

Figure 4B:
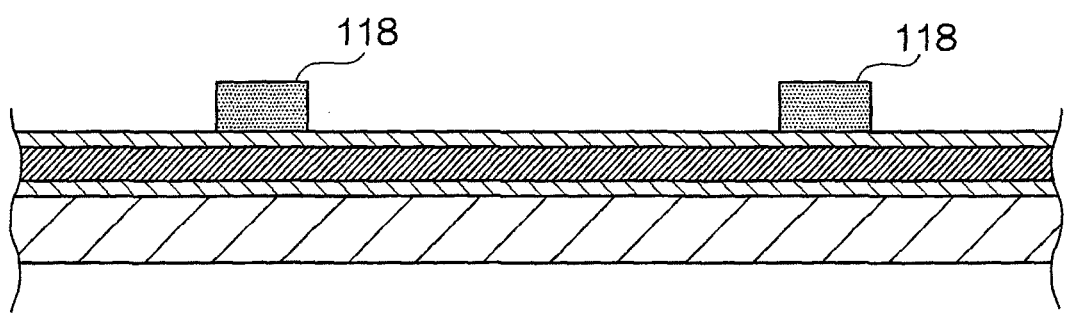

Thereafter, as shown in FIG. 4B, marking members 118 having a rectangular parallelepiped shape are respectively adhered, with an adhesive, to a principal surface of cladding layer 114B at the four corners of a region that will become optical waveguide film main body 116.

The term, "principal surface" of optical waveguide film main body 116 (polymer film 10A), refers to a surface that is perpendicular to the direction of layering of upper cladding layer 114A (the first cladding layer), core layer 112A, and cladding layer 114B (the second cladding layer) (i.e., perpendicular to the thickness direction of optical waveguide film main body 116). In other words, optical waveguide film main body 116 has substantially planar surfaces including an upper surface and a lower surface, and the upper and lower surfaces are each referred to as a "principal surface" of the optical waveguide.

Figure 4C:
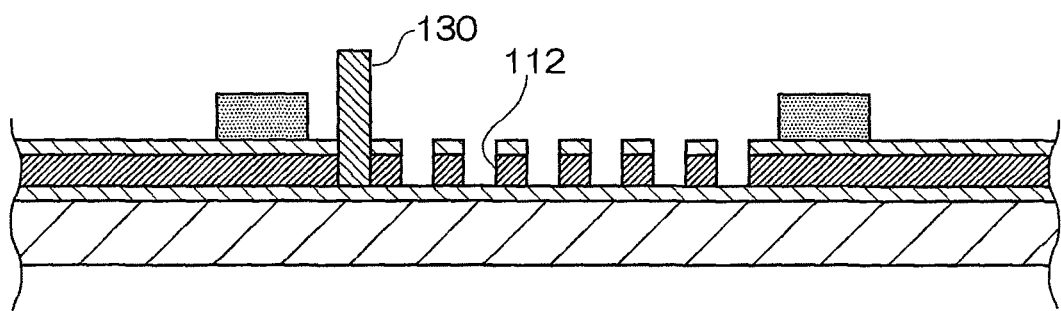

Thereafter, as shown in FIG. 4C, polymer film 10A is cut from the cladding layer 114B side (i.e., cladding layer 114B and core layer 112A are cut) to form optical waveguide cores 112. The formation of optical waveguide cores 112 can be performed by, for example, cutting polymer film 10A along the longitudinal direction of polymer film 10A with a dicing saw and repeating the cutting with a predetermined spacing in the width direction of polymer film 10A (the spacing will be the width of each optical waveguide core 112). By the cutting, plural optical waveguide cores 112 are formed that are disposed in the same plane on cladding layer 114A and that are parallel to each other, such that a beam of light travels through each core and the respective beams are parallel to each other and separated in the direction of the width of polymer film 10A. In the exemplary embodiment, six optical waveguide cores 112 are formed. In FIGS. 4C to 4D and 5E to 5F, the reference numeral 130 designates a blade of a dicing saw.

Figure 4D:
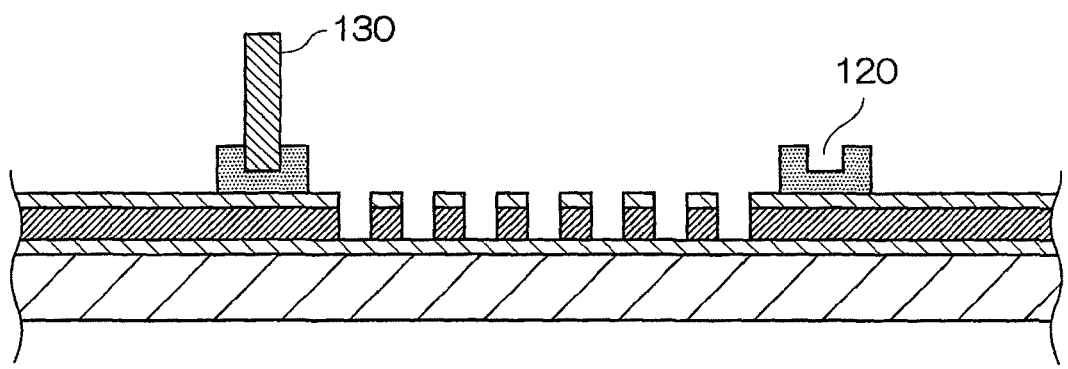

Then, subsequently to the cutting of core layer 112A described above, a surface (top surface) of each marking member 118 is cut so as to form a groove-shaped positioning mark 120, as shown in FIG. 4D. Specifically, for example, the top surface of each marking member 118 is cut in the same direction as the cutting direction of core layer 112A (the longitudinal direction of the formed grooves). Then, top surface of each marking member 118 is cut in a direction that crosses the cutting direction of core layer 112A (the longitudinal direction of the formed grooves). As a result, a cross-shaped groove is formed on the top surface of each marking member 118, and serves as positioning mark 120.

The cutting of core layer 112A and the subsequent cutting at the surface (top surface) of each marking member 118 are conducted successively, which means, by the term "successively", that the cutting of core layer 112A and the cutting of marking members 118 are conducted successively after initial preparation for cutting, without inserting another step of preparation for cutting between the cutting of core layer 112A and the cutting of marking members 118. The preparation for cutting refers to attaching polymer film 10A having marking members 118, which are to be processed, to a particular processing position of the dicing saw so as to fix the attachment position relative to the machine datum of the dicing saw.

The method for attaching the material to be processed to the dicing saw may be performed by vacuum chucking via the adhered dicing tape. The positioning of the attached material is maintained unless the processing set-up is changed by, for example, releasing the vacuum chucking, exchanging the dicing blade, or resetting the system of the dicing saw. When the material to be processed is a polymer film, the position of the material may change when the dicing tape is re-attached or when the dicing tape itself is deformed by vacuum chucking. Therefore, when plural portions are to be processed, occurrence of positional error of the plural grooves to be formed or occurrence of the positional error of the cutting portion may be suppressed by performing the cutting successively after preparation for cutting.

Figure 5E:
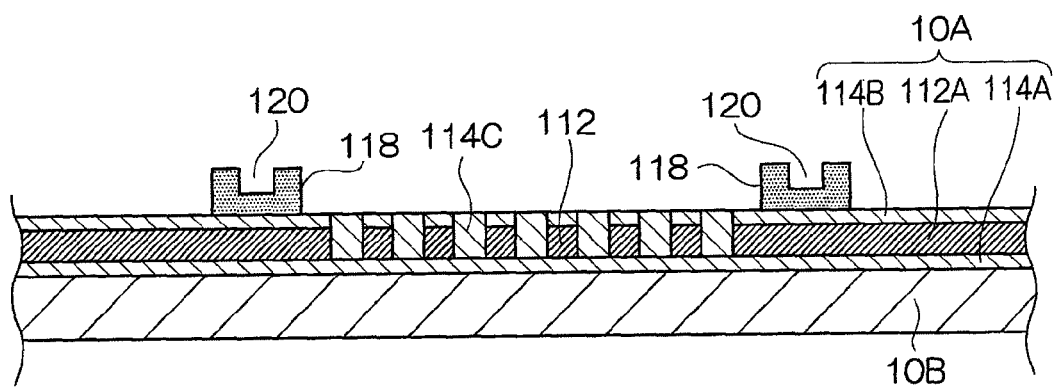
FIGS. 5E to 5F are process charts illustrating the remaining part of the method for producing an optical waveguide film according to the first exemplary embodiment.

Then, as shown in FIG. 5E, after polymer film 10A is separated from the dicing saw, optical waveguide cores 112 are covered with a curable resin for forming cladding. In other words, the curable resin for forming cladding is applied to fill the grooves that have been formed by the cutting, and the resin is cured to form cladding layer 114C (a third cladding layer). Specifically, for example, a curable resin for cladding is applied dropwise to a surface of polymer film 10A that has been cut, and is spread by a centrifugal force according to a spin coating method, so that the curable resin for cladding covers optical waveguide cores 112 and the respective grooves formed by the cutting are filled with the curable resin for cladding; then the resin is cured. The method for applying the curable resin for cladding is not limited to the spin coating method, and may be a method including spreading the curable resin for cladding by pressing a glass substrate against the resin with the thickness of the curable resin controlled by a spacer and exposing the resin to light so as to cure the resin. As a result, cladding 114 (cladding layers 114A, 114B, and 114C) is formed to enclose optical waveguide cores 112.

The curable resin for forming cladding that is used for forming cladding layer 114C may be a material in a liquid state, and may be, for example, a radiation-curable, electron-beam-curable, or thermosetting resin. Among them, the curable resin is preferably a UV-curable resin or a thermosetting resin, and is more preferably a UV-curable resin. Examples of the UV-curable or thermosetting resin include a UV-curable or thermosetting monomer, a UV-curable or thermosetting oligomer, and a mixture of the monomer and the oligomer. Examples of the UV-curable resin include an epoxy UV-curable resin and an acrylic UV-curable resin. Examples of the thermosetting resin include a polyimide resin and a silicone resin.

Figure 5F:
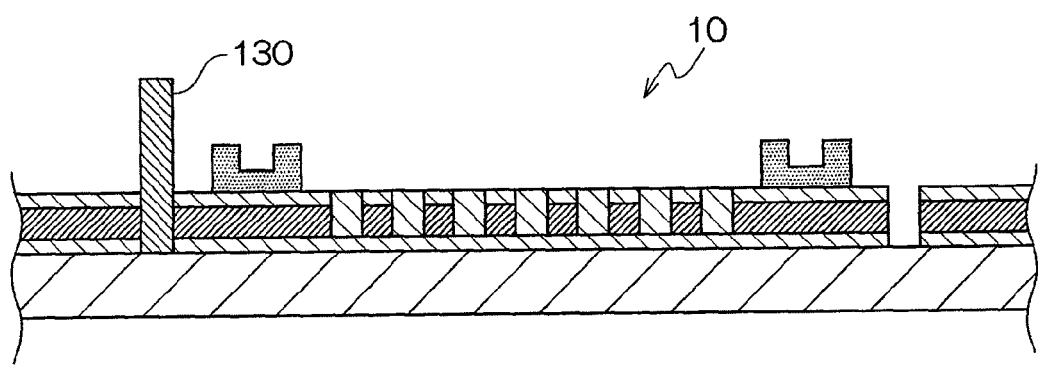
Figure 6:
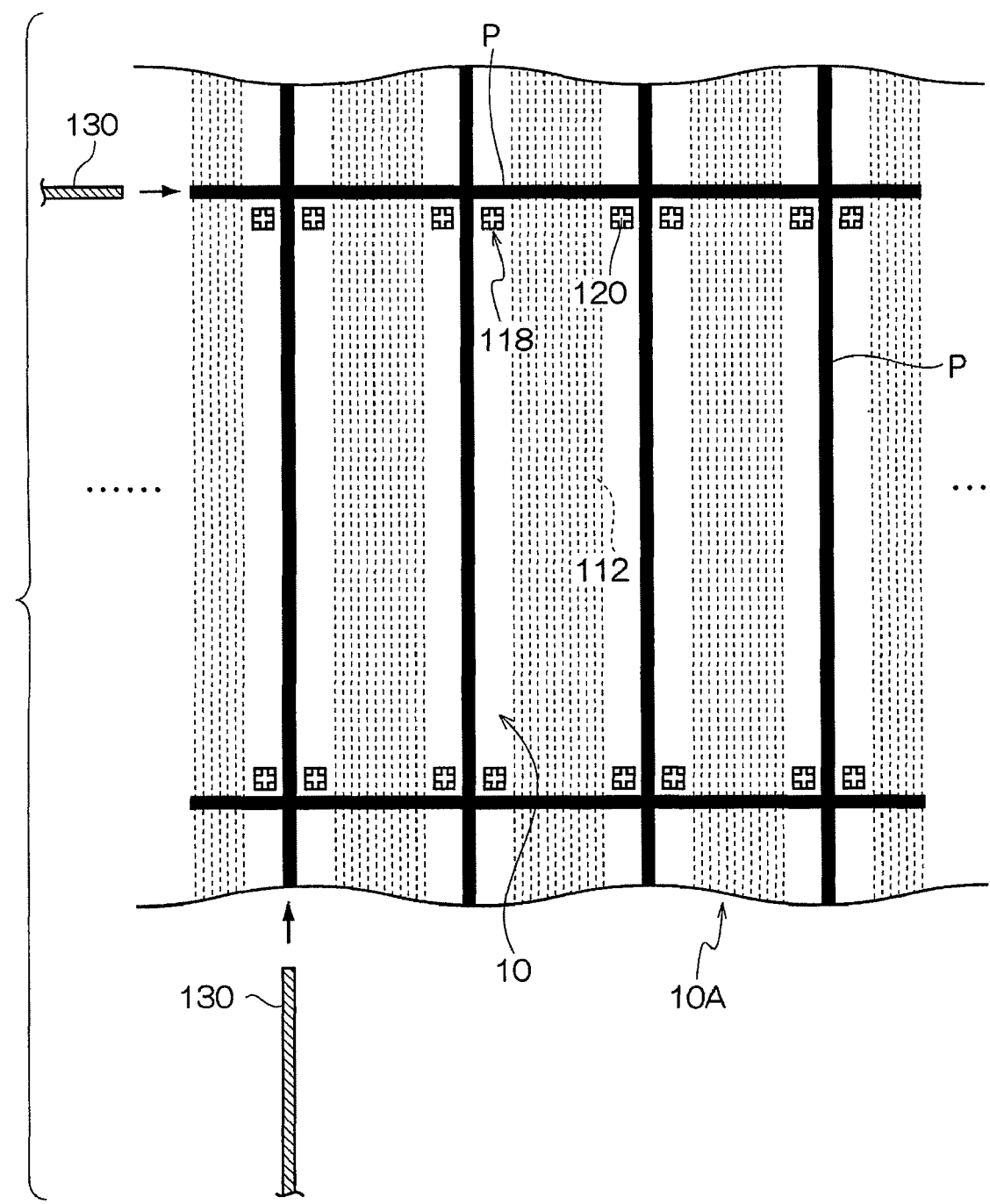
FIG. 6 is a top view of polymer film 10A when polymer film 10A is cut to form an outer shape of the optical waveguide film in the method for producing an optical waveguide film according to the first exemplary embodiment.

Thereafter, as shown in FIGS. 5F and 6, polymer film 10A on which optical waveguide cores 112 are formed is placed on a dicing saw again, and polymer film 10A is cut along cutting lines P so as to form the outer shapes of optical waveguide films, whereby plural optical waveguide films 10 are formed from one polymer film. FIG. 6 is a top view of polymer film 10A showing the cutting process for cutting polymer film 10A so as to form outer shapes of optical waveguide films in a method according to the first exemplary embodiment for producing an optical waveguide film.

The cutting for making optical waveguide film 10 (to be produced) to have an inclined surface as an end surface thereof in the longitudinal direction may be performed, for example with a dicing saw having a blade whose edge has an 45°-inclined structure. The end surface includes an end surface of cladding 114 and end surfaces of optical waveguide cores 112.

In optical waveguide film 10 according to the exemplary embodiment described above, marking members 118 are formed on one of the principal surfaces of optical waveguide film main body 116 and protrude from the one of the principal surface. Each marking member 118 has groove-shaped positioning mark 120 on an upper surface thereof.

Usually, a dicing saw cuts a material to be processed having a thickness of 1 mm or less by rotating a blade having a diameter of about 50 mm at high speed. Therefore, while the cutting position and the cutting depth can be controlled accurately with the dicing saw, the cutting length cannot be controlled accurately. In other words, the dicing saw is able to perform only linear cutting that crosses an entire surface of the material to be processed. Accordingly, when a cross-shaped groove, which is an example of the positioning mark, is formed at each of the four corners of an optical waveguide film main body in which optical waveguide cores have been formed, cutting is inevitably conducted across the formed optical waveguide cores, which may lead to deterioration of the properties of the optical waveguide film.

Therefore, in the present exemplary embodiment, marking members 118 are disposed so as to protrude from one of the principal surfaces of optical waveguide film main body 116, and groove-shaped positioning mark 120 is formed at each marking member 118, as described above. In short, the position of cutting for forming positioning marks 120 is set at a higher level than the position of cutting of the core layer for forming optical waveguide cores, by providing marking members 118. Therefore, groove-shaped positioning marks 120 can be formed while deterioration of flexibility and light-transmitting properties due to, for example, damage to optical waveguide film main body 116 (polymer film 10A) is suppressed regardless of the direction of the groove. In addition, the cutting of the core layer for forming optical waveguide cores 112 and the cutting of the marking members for forming positioning marks 120 are conducted successively, so that optical waveguide cores 112 and positioning marks 120 are formed with an accurate distance relationship therebetween. In short, positioning marks 120, which serve as bases for alignment, are formed with high accuracy.

Since each of positioning marks 120 has a groove shape, alignment can be conducted by visual alignment or, alternatively, by fitting an alignment member into the groove-shaped positioning mark 120 so as to perform attachment.

Since positioning marks 120 are provided at marking members that are not a part of optical waveguide film 116, optical waveguide film 116 (polymer film 10A) may have a normal configuration.

High-precision connection can be achieved when optical waveguide film 10 according to the present exemplary embodiment is connected to another connection device (such as a connector, a light-emitting device, or a light-receiving device) by, for example, fitting a protruding portion of the connection device into the cross-shaped groove as a mark for positioning. The protruding portion corresponds to the cross-shaped groove as positioning mark 120; in other words, the protruding portion can fit into the cross-shaped groove.

Second Embodiment

Figure 7:
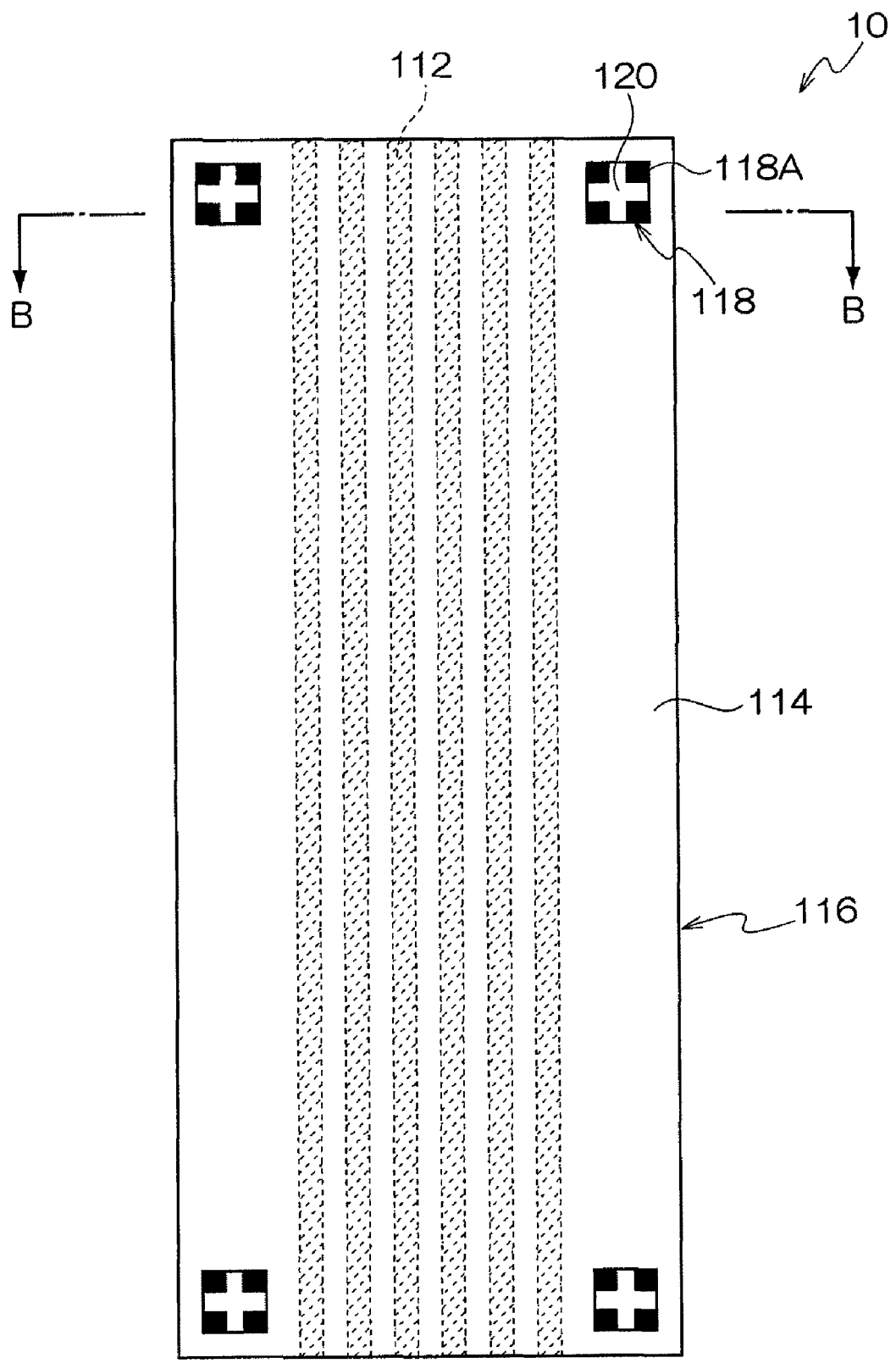
FIG. 7 is a schematic top view illustrating an optical waveguide film according to a second exemplary embodiment.
Figure 8:
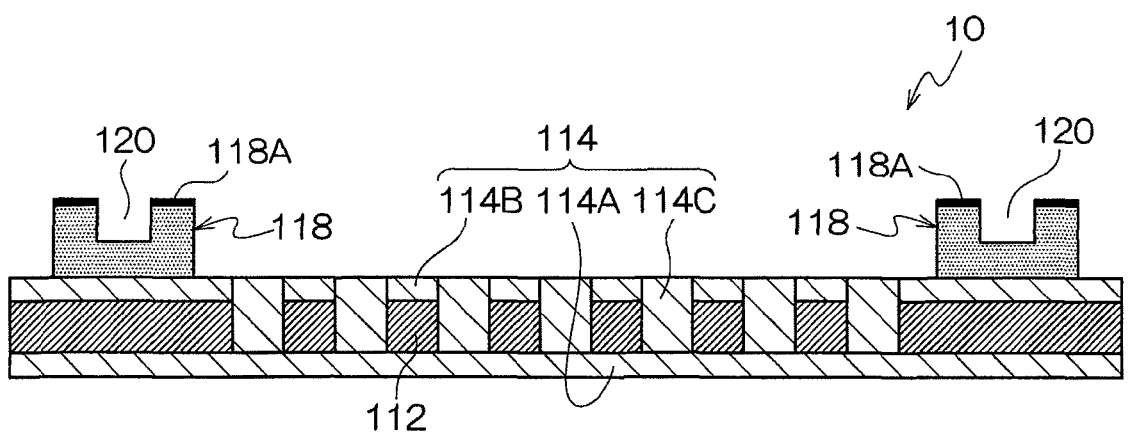
FIG. 8 is a cross-sectional view taken along line B-B shown in FIG. 7.
Figure 9A:
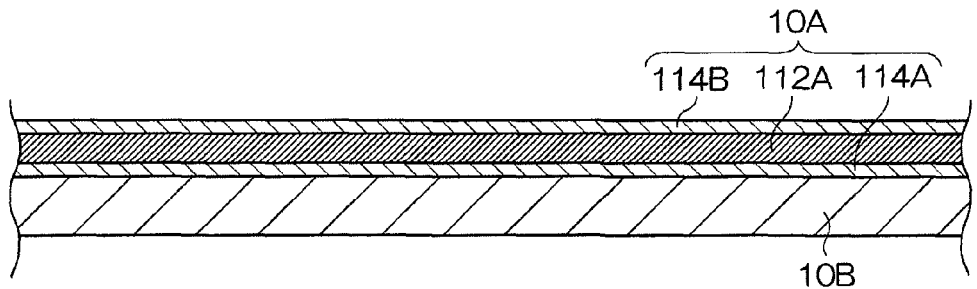
FIGS. 9A to 9D are process charts illustrating a first part of a method for producing an optical waveguide film according to a second exemplary embodiment.
Figure 9B:
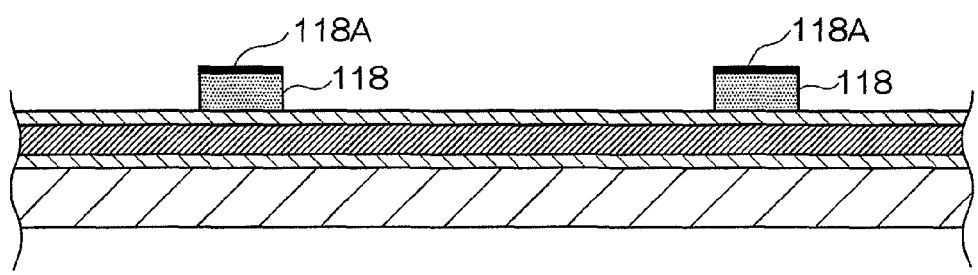
Figure 9C:
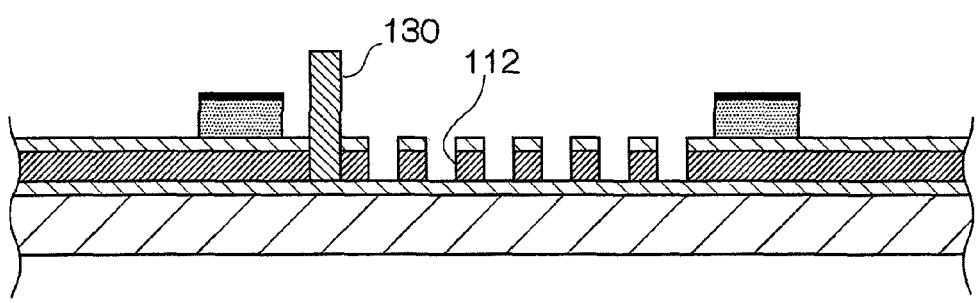
Figure 9D:
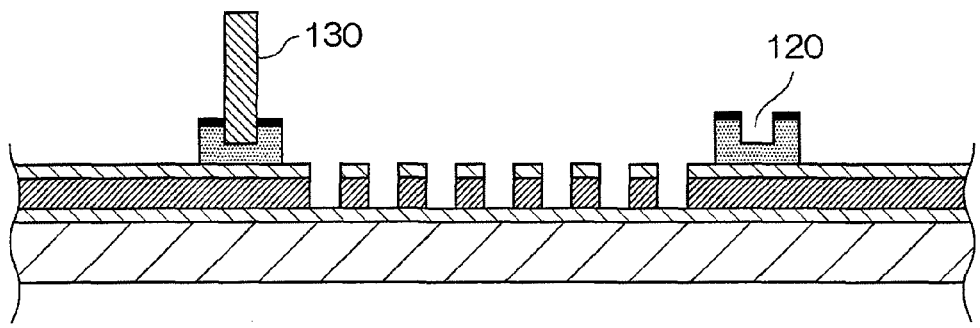
Figure 10E:
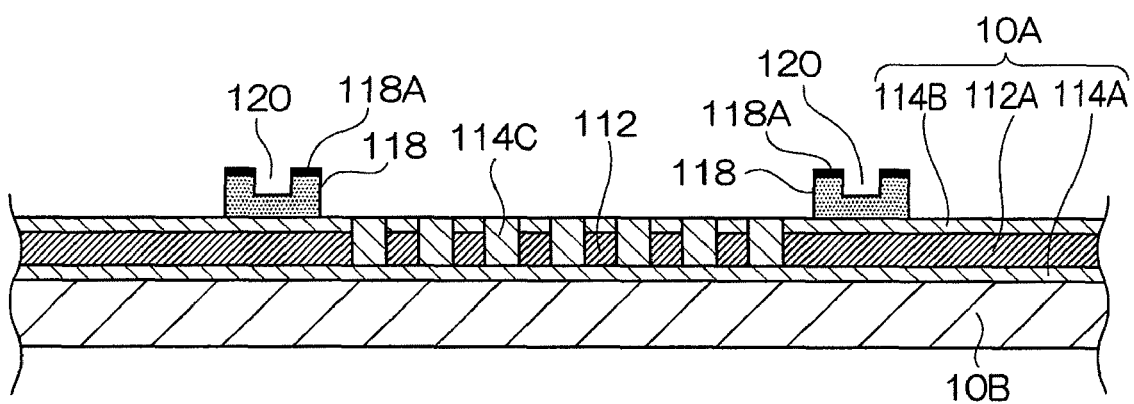
FIGS. 10E to 10F are process charts illustrating the remaining part of the method for producing an optical waveguide film according to the second exemplary embodiment.
Figure 10F:
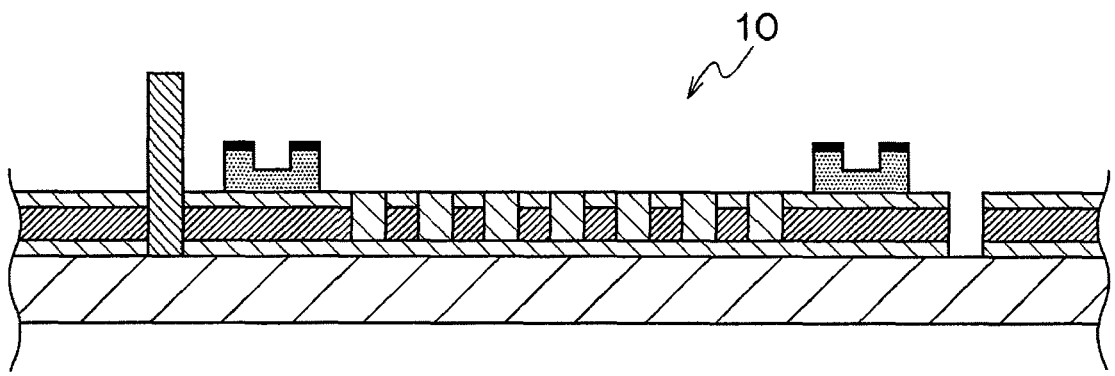

FIG. 7 is a schematic top view illustrating an optical waveguide film according to a second exemplary embodiment. FIG. 8 is a cross-sectional view taken along line B-B shown in FIG. 7. FIGS. 9A to 9D and 10E to 10F are process charts that illustrate a method for producing an optical waveguide film according to the second exemplary embodiment and that are cross-sectional views taken along line B-B shown in FIG. 7.

Optical waveguide film 10 according to the second exemplary embodiment has a configuration in which, as shown in FIGS. 7 and 8, colored layer 118A is formed on a surface (top surface) of each marking member 118 at which a positioning mark is provided except for a region at which groove-shaped positioning mark 120 is formed. For example, each marking member 118 having colored layer 118A on a surface (top surface) thereof which is to be cut, may be cut from the colored layer 118A side to a depth that reaches the marking member 118, so as to form a groove-shaped positioning mark (see FIG. 9D). The configuration is the same as that of the first exemplary embodiment, except for the structure described above. Therefore, duplicated description is omitted.

Colored layer 118A may be provided by, for example, depositing a dye ink on the top surface of each marking member 118 formed of a resin so as to allow the dye ink to penetrate into the marking member 118, or by separately coating the top surface with a resin in which a colorant is blended. The color of colored layer 118A is different from that of the marking member 118, and may be red, for example. The color of colored layer 118A is not particularly limited.

As shown in FIGS. 9A to 9D and 10E to 10F, a method for producing optical waveguide film 10 according to the present exemplary embodiment is the same as in the first exemplary embodiment, except that marking members 118 each having colored layer 118A thereon are formed on a principal surface of polymer film 10A (see FIG. 9B), and that cutting is conducted from the colored layer 118A side to a depth that reaches marking members 118 so as to form groove-shaped positioning marks 120.

In optical waveguide film 10 according to the present exemplary embodiment, since groove-shaped positioning mark 120 and colored layer 118A are disposed on a surface (top surface) of each marking member 118 such that colored layer 118A is disposed at regions other than a region at which groove-shaped positioning mark 120 is formed, groove-shaped positioning mark 120 and regions other than mark 120 have different colors, so that a contrast is provided. Further, positioning mark 120 can be visually recognized not only by reflected light, but also by transmitted light. Therefore, the visibility of positioning mark 120 is improved compared to when colored layer 118A is not provided at marking member 118.

EXAMPLES

The present invention is described specifically below by way of examples. However, the examples should not be construed as limiting the invention.

Example 1

A 205 mm-square (205 mm×205 mm) three-layered polymer film is prepared in which an epoxy resin film (core layer having a thickness of 60 µm and a refractive index of 1.59) are sandwiched between two epoxy resin films (cladding layers each having a thickness of 20 µm and a refractive index of 1.55). The Young's modulus of the polymer film is found to be 2.2 GPa.

The three-layered polymer film is attached to a dicing tape. Then, Si pieces (having a size of 3 mm-square, a thickness of 3 mm, and a Young's modulus of 160 GPa) as marking members, which have been cut out from a Si wafer, are adhered and fixed to a surface of the three-layered polymer film opposite to the side at which the dicing tape is attached, such that the Si pieces are fixed to the four corners of an area that is to form an optical waveguide film, wherein a UV-curable epoxy resin is used for the adhesion. The Si pieces as marking members are provided in accordance with the size of the optical waveguide film and the number of the optical waveguide films taken from one sheet of the three-layered polymer film. In this Example, optical waveguide films each having a width of 25 mm are cut out of a polymer film having a width of 205 mm, so that the number of the optical waveguide films produced from one sheet of the three-layered polymer film is eight. Further, since four Si pieces are disposed at the respective corners (four corners) of each optical waveguide film, thirty-two (eight times four) Si pieces are disposed on the three-layered polymer film in this Example.

Thereafter, the three-layered polymer film having the Si pieces as marking members is set to a dicing saw (DFD6361 manufactured by DISCO Corporation) compatible with a size of 12 inch. Then, a dicing saw equipped with a 65 µm-wide blade is used to perform half-cut from the principal surface side of the polymer film (i.e., from the top-surface cladding layer, which is a cladding layer at a side opposite to the side adhered to the dicing tape) to a depth that penetrates through the top-surface cladding layer and the core layer. The half-cut is conducted 101 times at a feed pitch of 125 µm so as to form recess portions (groove portions). As a result, 100 optical waveguide cores (100 ch) each having a core diameter of 60 µm are formed at a pitch of 125 µm.

Directly following the cutting for forming the optical waveguide cores, the top surface of the Si pieces as marking members are cut at a blade cutting depth of 100 µm, so that marks for positioning each formed by a cross-shaped groove are formed. Since the cutting for forming the marks for positioning is conducted above the polymer film, damage or the like is not generated on the polymer film.

Then, the polymer film after the cutting is detached from the dicing saw, and an epoxy UV-curable resin having a refractive index of 1.51 is applied to fill the groove portions formed by the cutting from the principal surface of the polymer film, followed by irradiation of UV rays to cure the resin.

Thereafter, the polymer film, in which the groove portions are filled with the epoxy UV-cured resin, is set again to the dicing saw (DFD6361 manufactured by DISCO Corporation)

compatible with a size of 12 inch. The polymer film is cut using the cross-shaped grooves (marks for positioning) as position references so as to form outer shape of optical waveguide films, whereby plural (eight) optical waveguide films are obtained.

Each of the obtained optical waveguide films has a size of 200 mm (length)×25 mm (width)×0.1 mm (thickness), and 100 optical waveguide cores each having a core diameter of 60 μm are formed at a pitch of 125 μm at a central portion of the optical waveguide film. On a principal surface of the optical waveguide film (optical waveguide film main body), four 3 mm-square marking members (Si pieces) having a thickness of 3 mm are formed at the four corners of the principal surface (more specifically, at the four corners of a rectangle that is 2 mm inside the edge of the principal surface of the optical waveguide film). At the top surface of each marking member (Si piece), a positioning mark formed by a cross-shaped groove having a depth of 100 μm and a width of 60 μm is formed. At each end of the optical waveguide film in the longitudinal direction thereof, each core protrudes, in the longitudinal direction, toward the end beyond a line connecting the two positioning marks (cross-shaped grooves) disposed near the end and separated in the width direction of the optical waveguide film. The distance between the centers of the two positioning marks (cross-shaped grooves) is 20 mm, and the core array, which contains 100 optical waveguide cores and has a total width of 12.5 mm, is disposed at a central portion with respect to the width (20 mm) of the optical waveguide film.

When the insertion loss of the obtained optical waveguide film is measured, the insertion loss is found to be in a range of from 2.5 dB to 2.8 dB, and the bend loss is negligible down to a curvature radius of 2 mm. Further, an operation including connecting and fixing a connector having a protruding portion corresponding to the cross-shaped groove positioning mark of the optical waveguide film (a protruding portion to be fitted into the cross-shaped groove) to the optical waveguide film by fitting the protruding portion into the cross-shaped groove, is repeated so that the operation is performed 30 times in total. The deviation of the optical waveguide core position relative to the connector is evaluated, and is found to be no more than 10 μm in terms of the value of 3σ (σ representing the standard deviation).

Example 2

An optical waveguide film is produced in the same manner as in Example 1, except that glass fiber reinforced polycarbonate pieces (3 mm-square, having a thickness of 3 mm and a hardness of 5 GPa) on which a red colored layer (having a thickness of 0.1 μm) has been formed by applying a dye ink (kind: Rhodamine Red) to a top surface thereof are used as marking members, and that cutting of both end portions of the optical waveguide film in the longitudinal direction thereof is conducted with a dicing saw having a V-shaped blade so as to form a 45° inclined surface at each end of the optical waveguide in the longitudinal direction thereof.

The insertion loss of the obtained optical waveguide film is measured, and is found to be in a range of from 2.5 dB to 2.8 dB, and the bend loss is negligible down to a curvature radius of 2 mm.

Further, one end of the optical waveguide film in the longitudinal direction thereof is adhered and fixed to a light-receiving device array of 100 ch, using an aligning and adhering apparatus that performs positioning using a microscope optical system using the cross-shaped groove as a positioning mark and image processing. This operation is repeated to conduct the operation 30 times in total. The deviation of the optical waveguide core position relative to the light-receiving device is evaluated, and is found to be no more than 8 μm in terms of the value of 3σ (σ representing the standard deviation).

What is claimed is:

1. A method for producing an optical waveguide film, comprising:
    preparing a laminated material including at least a first cladding layer, a core layer, and a second cladding layer that are layered in this order;
    providing, on at least a portion of a principal surface of the laminated material, a marking member that protrudes from the principal surface;
    cutting the second cladding layer and the core layer so as to form groove portions and so as to form an optical waveguide core through which light travels, and then cutting the marking member to form a mark for positioning; and
    forming a third cladding layer in the groove portions so as to enclose the optical waveguide core within the first to third cladding layers.

2. The method according to claim 1, wherein the cutting of the second cladding layer and the core layer is performed using a dicing saw.

3. The method according to claim 1, wherein the marking member has a colored layer on a surface that is cut.

4. The method according to claim 1, wherein the marking member is formed of a harder material than the laminated material.

5. The method according to claim 4, wherein the Young's modulus of the marking member is from about 5 GPa to about 300 GPa.

6. The method according to claim 4, wherein the Young's modulus of the marking member is from about 10 GPa to about 200 GPa.

7. The method according to claim 1, wherein the marking member is formed of silicone, glass ($SiO_2$) or a resin.

8. The method according to claim 1, wherein the Young's modulus of the optical waveguide film main body is about 5 GPa or less.

9. The method according to claim 1, wherein the marking member is disposed at each of four corners of the principal surface of the optical waveguide film main body.

* * * * *